US012731522B2

(12) United States Patent
Hong et al.

(10) Patent No.: US 12,731,522 B2
(45) Date of Patent: Sep. 8, 2026

(54) DISPLAY DEVICE INCLUDING TIMING CONTROLLER GENERATING COMPENSATION VALUE BASED ON FLAG SIGNAL

(71) Applicant: Samsung Display Co., LTD., Yongin-si (KR)

(72) Inventors: Seokha Hong, Yongin-si (KR); Kyungsu Lee, Yongin-si (KR); Kanghee Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/826,585

(22) Filed: Sep. 6, 2024

(65) Prior Publication Data

US 2025/0218333 A1 Jul. 3, 2025

(30) Foreign Application Priority Data

Dec. 28, 2023 (KR) ........................ 10-2023-0195460

(51) Int. Cl.
*G09G 3/20* (2006.01)
*G09G 3/30* (2006.01)
(Continued)

(52) U.S. Cl.
CPC ............. *G09G 3/2092* (2013.01); *G09G 3/30* (2013.01); *G09G 3/32* (2013.01); *G09G 3/3208* (2013.01);
(Continued)

(58) Field of Classification Search
CPC .......... G09G 3/2092; G09G 3/30; G09G 3/32; G09G 3/3208; G09G 2310/08; G09G 2320/0233; G09G 2320/0257
See application file for complete search history.

(56) References Cited

U.S. PATENT DOCUMENTS 10,186,184 B2 1/2019 Kim
10,861,387 B2 12/2020 Kim et al.
(Continued)

FOREIGN PATENT DOCUMENTS

KR 1020180013189 A 2/2018
KR 102356647 B1 1/2022
(Continued)

*Primary Examiner* — Adam J Snyder
(74) *Attorney, Agent, or Firm* — CANTOR COLBURN LLP

(57) ABSTRACT

A display device includes a display panel in which a display area is defined and a timing controller. The display panel includes a plurality of blocks each including a plurality of pixels, and the timing controller generates a representative compensation value with respect to each of the blocks. The display area includes a first area and a second area, a boundary line is defined between the first area and the second area, the blocks include a first block adjacent to the boundary line and a second block spaced apart from the boundary line, the timing controller generates a flag signal with respect to the first block, the timing controller generates a first compensation value based on the flag signal, and the timing controller generates a second compensation value using the representative compensation value of the second block and the representative compensation value of another block adjacent to the second block among the blocks.

20 Claims, 8 Drawing Sheets

(51) Int. Cl.
*G09G 3/32* (2016.01)
*G09G 3/3208* (2016.01)

(52) U.S. Cl.
CPC . *G09G 2310/08* (2013.01); *G09G 2320/0233* (2013.01); *G09G 2320/0257* (2013.01)

(56) References Cited

U.S. PATENT DOCUMENTS

| | | | | |
|---|---|---|---|---|
| 11,574,570 | B2 | 2/2023 | Kang et al. | |
| 11,574,612 | B2 | 2/2023 | Park et al. | |
| 11,790,849 | B2 | 10/2023 | Pyun et al. | |
| 2015/0187289 | A1* | 7/2015 | Kim | G09G 3/20 345/89 |
| 2017/0061927 | A1* | 3/2017 | Yoon | G09G 3/3275 |
| 2018/0342192 | A1* | 11/2018 | Lee | G09G 3/2007 |
| 2022/0005426 | A1* | 1/2022 | Gao | G09G 3/3611 |

FOREIGN PATENT DOCUMENTS

| | | | |
|---|---|---|---|
| KR | 1020220016011 | A | 2/2022 |
| KR | 1020220021961 | A | 2/2022 |
| KR | 1020220099169 | A | 7/2022 |

* cited by examiner

DISPLAY DEVICE INCLUDING TIMING CONTROLLER GENERATING COMPENSATION VALUE BASED ON FLAG SIGNAL

This application claims priority to Korean Patent Application No. 10-2023-0195460, filed on Dec. 28, 2023, and all the benefits accruing therefrom under 35 U.S.C. § 119, the content of which in its entirety is herein incorporated by reference.

BACKGROUND

1. Field

The disclosure relates to a display device with improved display quality.

2. Description of Related Art

A display device includes various electronic components, such as a display panel displaying an image, an input sensor sensing an external input, an electronic module, etc. The electronic components are electrically connected to each other by signal lines arranged in various ways. The display panel includes a plurality of pixels. Each of the pixels includes a light-emitting element generating a light and a pixel driving circuit controlling a current flowing through the light-emitting element.

SUMMARY

The disclosure provides a display device with improved display quality.

An embodiment of the inventive concept provides a display device including a display panel in which a display area is defined and a timing controller. The display panel includes a plurality of blocks each including a plurality of pixels, and the timing controller generates a representative compensation value with respect to each of the plurality of blocks. The display area includes a first area in which a first image is displayed and a second area in which a second image different from the first image is displayed, and the second area is spaced apart from the first area in a predetermined direction. A boundary line is defined between the first area and the second area, the plurality of blocks includes a first block adjacent to the boundary line and a second block spaced apart from the boundary line, the timing controller generates a flag signal with respect to the first block, the timing controller generates a first compensation value with respect to the first block based on the flag signal, and the timing controller generates a second compensation value different from the first compensation value using the representative compensation value of the second block and the representative compensation value of another block adjacent to the second block among the plurality of blocks.

In an embodiment, the first block is provided in plural, and a plurality of first blocks includes a first-first block and a first-second block spaced apart from the first-first block with the boundary line interposed therebetween.

In an embodiment, a plurality of first pixel units each including at least one pixel among the plurality of pixels is defined in the first-first block, a plurality of second pixel units each including at least one pixel among the plurality of pixels is defined in the first-second block, and the timing controller generates a plurality of first pixel compensation values with respect to the plurality of first pixel units, respectively, and generates a plurality of second pixel compensation values with respect to the plurality of second pixel units, respectively.

In an embodiment, the first compensation value of the first-first block is a first average value of the plurality of first pixel compensation values, and the first compensation value of the first-second block is a second average value of the plurality of second pixel compensation values.

In an embodiment, the first-first block is disposed in the first area, the first-second block is disposed in the second area, and the first average value is different from the second average value.

In an embodiment, the second image is a black image.

In an embodiment, the second block is provided in plural, and the first block is disposed between a plurality of second blocks.

In an embodiment, the first block includes a first block portion and a second block portion adjacent to the first block portion with the boundary line interposed therebetween.

In an embodiment, a plurality of first pixel units each including at least one pixel among the plurality of pixels is defined in the first block portion, a plurality of second pixel units each including at least one pixel among the plurality of pixels is defined in the second block portion, and the timing controller generates a plurality of first pixel compensation values with respect to the plurality of first pixel units, respectively, and generates a plurality of second pixel compensation values with respect to the plurality of second pixel units, respectively.

In an embodiment, the first compensation value of the first block portion is a first average value of the plurality of first pixel compensation values, and the first compensation value of the second block portion is a second average value of the plurality of second pixel compensation values.

In an embodiment, the timing controller generates the first compensation value using only the representative compensation value of the first block.

In an embodiment, the first block includes a first block portion and a second block portion adjacent to the first block portion, and the timing controller generates a partial compensation value with respect to each of the first and second block portions.

In an embodiment, the second compensation value is generated by adding the representative compensation value of the second block and a value obtained by interpolating the representative compensation value of another block adjacent to the second block among the plurality of blocks.

An embodiment of the inventive concept provides a display device including a display panel in which a display area is defined and a timing controller. The display panel includes a plurality of blocks each including a plurality of pixels, and the timing controller generates a representative compensation value with respect to each of the plurality of blocks. The display area includes a first area in which a first image is displayed and a second area in which a second image different from the first image is displayed, and the second area is spaced apart from the first area in a predetermined direction. A boundary line is defined between the first area and the second area, the plurality of blocks includes a first block adjacent to the boundary line and a second block spaced apart from the boundary line, the timing controller generates a first compensation value with respect to the first block in a first unit, and the timing controller generates a second compensation value with respect to the second block in a second unit greater than the first unit.

In an embodiment, the first block is provided in plural, and a plurality of first blocks includes a first-first block and a first-second block spaced apart from the first-first block with the boundary line interposed therebetween.

In an embodiment, the first unit is defined as a pixel unit including at least one pixel among the plurality of pixels, the pixel unit includes a plurality of first pixel units defined in the first-first block and a plurality of second pixel units defined in the first-second block, and the timing controller generates a plurality of first pixel compensation values with respect to the plurality of first pixel units, respectively, and generates a plurality of second pixel compensation values with respect to the plurality of second pixel units, respectively.

In an embodiment, the first compensation value of the first-first block is a first average value of the plurality of first pixel compensation values, and the first compensation value of the first-second block is a second average value of the plurality of second pixel compensation values.

In an embodiment, the first-first block is disposed in the first area, the first-second block is disposed in the second area, and the first average value is different from the second average value.

In an embodiment, the second image is a black image.

In an embodiment, the second compensation value is generated by adding the representative compensation value of the second block and a value obtained by interpolating the representative compensation value of another block adjacent to the second block among the plurality of blocks.

According to the above, the timing controller generates the first compensation value with respect the first blocks adjacent to the boundary line in the pixel unit and generates the second compensation value with respect to the second blocks spaced apart from the boundary line in a block unit. Since a compensation process is performed in the block adjacent to the boundary line in the pixel unit, the compensation value is prevented from being reduced in a portion adjacent to the boundary line in the first area. Thus, the image retention occurring in the display panel is reduced or removed. Accordingly, the display device with improved display quality is provided.

BRIEF DESCRIPTION OF THE DRAWINGS

The above and other advantages of the disclosure will become readily apparent by reference to the following detailed description when considered in conjunction with the accompanying drawings, in which.

DETAILED DESCRIPTION

Figure 1A:
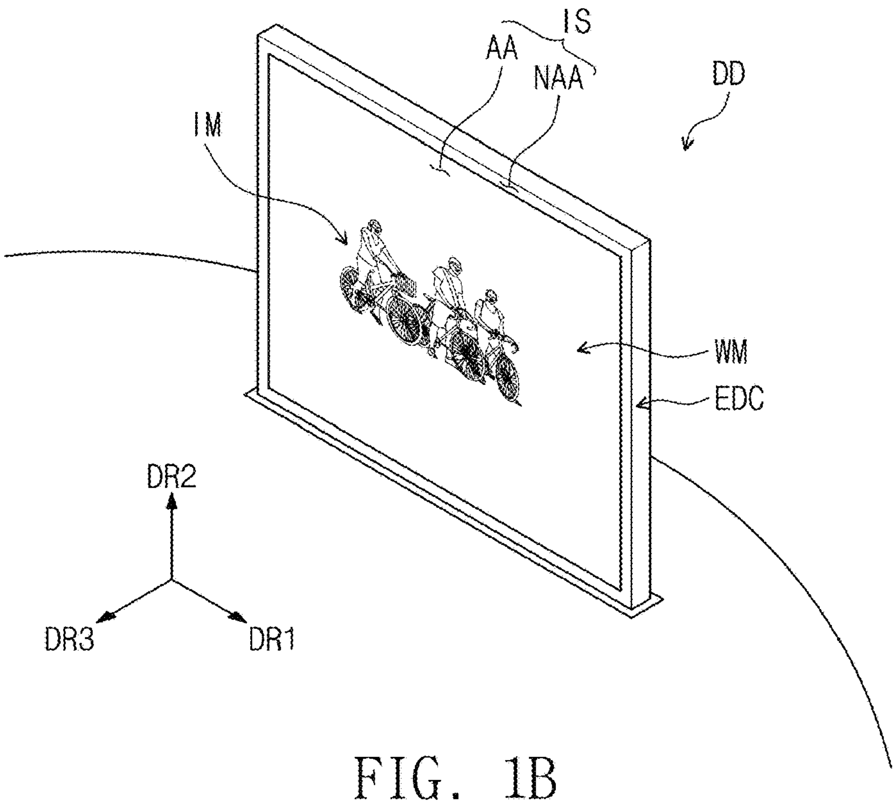
FIG. 1A is a perspective view of an embodiment of a display device that operates in a first mode according to the disclosure.

In the disclosure, it will be understood that when an element (or area, layer, or portion) is referred to as being "on", "connected to" or "coupled to" another element or layer, it may be directly on, connected or coupled to the other element or layer or intervening elements or layers may be present.

Like numerals refer to like elements throughout. In the drawings, the thickness, ratio, and dimension of components are exaggerated for effective description of the technical content. As used herein, the term "and/or" may include any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another elements or features as shown in the drawing figures.

It will be further understood that the terms "include" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the disclosure will be described with reference to accompanying drawings.

Figure 1B:
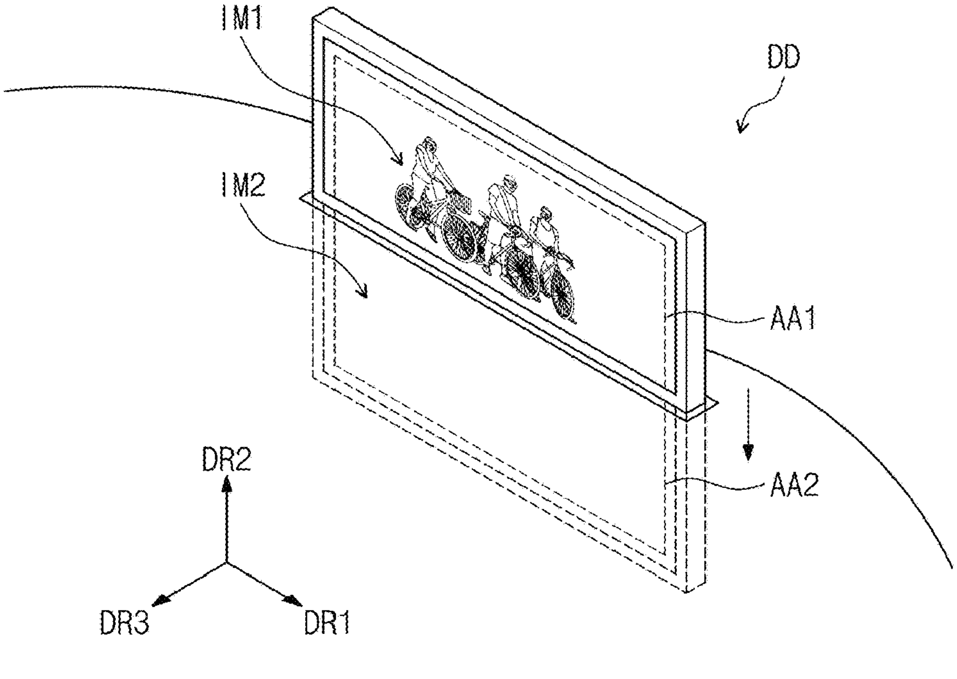
FIG. 1B is a perspective view of an embodiment of a display device that operates in a second mode according to the disclosure.

FIG. 1A is a perspective view of an embodiment of a display device DD that operates in a first mode according to the disclosure. FIG. 1B is a perspective view of an embodiment of the display device DD that operates in a second mode according to the disclosure.

Referring to FIGS. 1A and 1B, the display device DD may be a device activated in response to electrical signals. The display device DD may be applied to a television set, a monitor, an outdoor billboard, or a vehicle, however, the disclosure should not be limited thereto or thereby. The display device DD may be applied to a small and medium-sized display device, such as a personal computer, a notebook computer, a personal digital terminal, a game unit, a mobile electronic device, or a camera. The display device DD of the illustrated embodiment may be a flexible electronic device. In an embodiment, the display device DD may be a foldable, rollable, slidable, or stretchable electronic device. However, these are merely illustrative embodiments, and the display device DD may be applied to other electronic devices as long as they do not depart from the concept of the disclosure.

The display device DD may have a quadrangular shape, e.g., rectangular shape defined by long sides extending in a first direction DR1 and short sides extending in a second direction DR2 crossing the first direction DR1. However, the shape of the display device DD should not be limited to the rectangular shape, and the display device DD may have a variety of shapes. The display device DD may display an image IM toward a third direction DR3 through a display surface IS that is substantially parallel to each of the first direction DR1 and the second direction DR2. The display surface IS through which the image IM is displayed may correspond to a front surface of the display device DD.

The display device DD in the illustrated embodiment may be a display device for vehicles. The display device DD may be driven in the first mode while a vehicle is stationary and driven in the second mode while the vehicle is in motion. The display device DD may display the image IM through an effective area AA during the first mode as shown in FIG. 1A. When the first mode is switched to the second mode or vice versa, the display device DD may move in the second direction DR2 or a direction opposite to the second direction DR2 to expose a portion of the display surface IS. The display device DD may display a first image IM1 through a portion of the effective area AA and may display a second image IM2 through the other portion of the effective area AA during the second mode as shown in FIG. 1B. This will be described in detail later.

In the illustrated embodiment, front (or upper) and rear (or lower) surfaces of each member may be defined with respect to the direction in which the image IM is displayed. The front and rear surfaces may be opposite to each other in the third direction DR3, and a normal line direction of each of the front and rear surfaces may be substantially parallel to the third direction DR3.

A separation distance in the third direction DR3 between the front surface and the rear surface may correspond to a thickness in the third direction DR3 of the display device DD. Directions indicated by the first, second, and third directions DR1, DR2, and DR3 may be relative to each other and may be changed to other directions.

The display surface IS of the display device DD may include the effective area AA and a non-effective area NAA. The effective area AA may be an area through which the image IM is displayed. The user may view the image IM through the effective area AA. In the illustrated embodiment, the effective area AA may have a quadrangular shape with rounded vertices, however, this is merely one of embodiments. The effective area AA may have a variety of shapes and should not be particularly limited.

The non-effective area NAA may be defined adjacent to the effective area AA. In the description, the term "adjacent to" may mean "substantially close to" such as "immediately next to". The non-effective area NAA may have a predetermined color. The non-effective area NAA may surround the effective area AA. Accordingly, the effective area AA may have a shape substantially defined by the non-effective area NAA, however, this is merely one of embodiments. In an embodiment, the non-effective area NAA may be disposed adjacent to only one side of the effective area AA or may be omitted. The display device DD may include various embodiments and should not be particularly limited.

The effective area AA may include a first area AA1 and a second area AA2. The first area AA1 may be an area that is recognized by the user, and the second area AA2 may be an area that is not recognized by the user. The display device DD may display the image IM through the effective area AA during the first mode. The display device DD may display the first image IM1 through the first area AA1 during the second mode. The display device DD may display the second image IM2 through the second area AA2 during the second mode. The second image IM2 may be a black image.

The display device DD may sense an external input applied thereto from the outside. The external input may include inputs of various forms provided from the outside of the display device DD. The display device DD may sense an external input generated by a user and applied thereto. The external input by the user may include one of various forms of external inputs, such as a portion of the user's body, light, heat, gaze, or pressure, or any combinations thereof. In addition, the display device DD may sense the external input by the user applied to a side surface or a rear surface thereof according to a structure of the display device DD, however, it should not be particularly limited. In an embodiment, the external input may include inputs generated by an input device, e.g., a stylus pen, an active pen, a touch pen, an electronic pen, an e-pen, or the like.

The display device DD may have an exterior defined by a window WM and a housing EDC. In an embodiment, the window WM may be coupled with the housing EDC to provide an inner space of the housing EDC, and other components, e.g., a display module DM (refer to FIG. 2), of the display device DD, may be accommodated in the inner space of the housing EDC.

A front surface of the window WM may define the display surface IS of the display device DD. The window WM may include an optically transparent insulating material. In an embodiment, the window WM may include a glass or plastic material. The window WM may have a single-layer or multi-layer structure. In an embodiment, the window WM may include a plurality of plastic films coupled with each other by an adhesive or a glass substrate and a plastic film coupled with the glass substrate by an adhesive.

The housing EDC may include a material with a relatively high rigidity. In an embodiment, the housing EDC may include a plurality of frames and/or plates including or consisting of a glass, plastic, metal material, or combinations thereof. The housing EDC may stably protect the components of the display device DD accommodated in the inner space from external impacts. Although not shown in FIGS. 1A and 1B, a battery module that supplies a power source desired for an overall operation of the display device DD may be disposed between the display module DM and the housing EDC.

Figure 2:
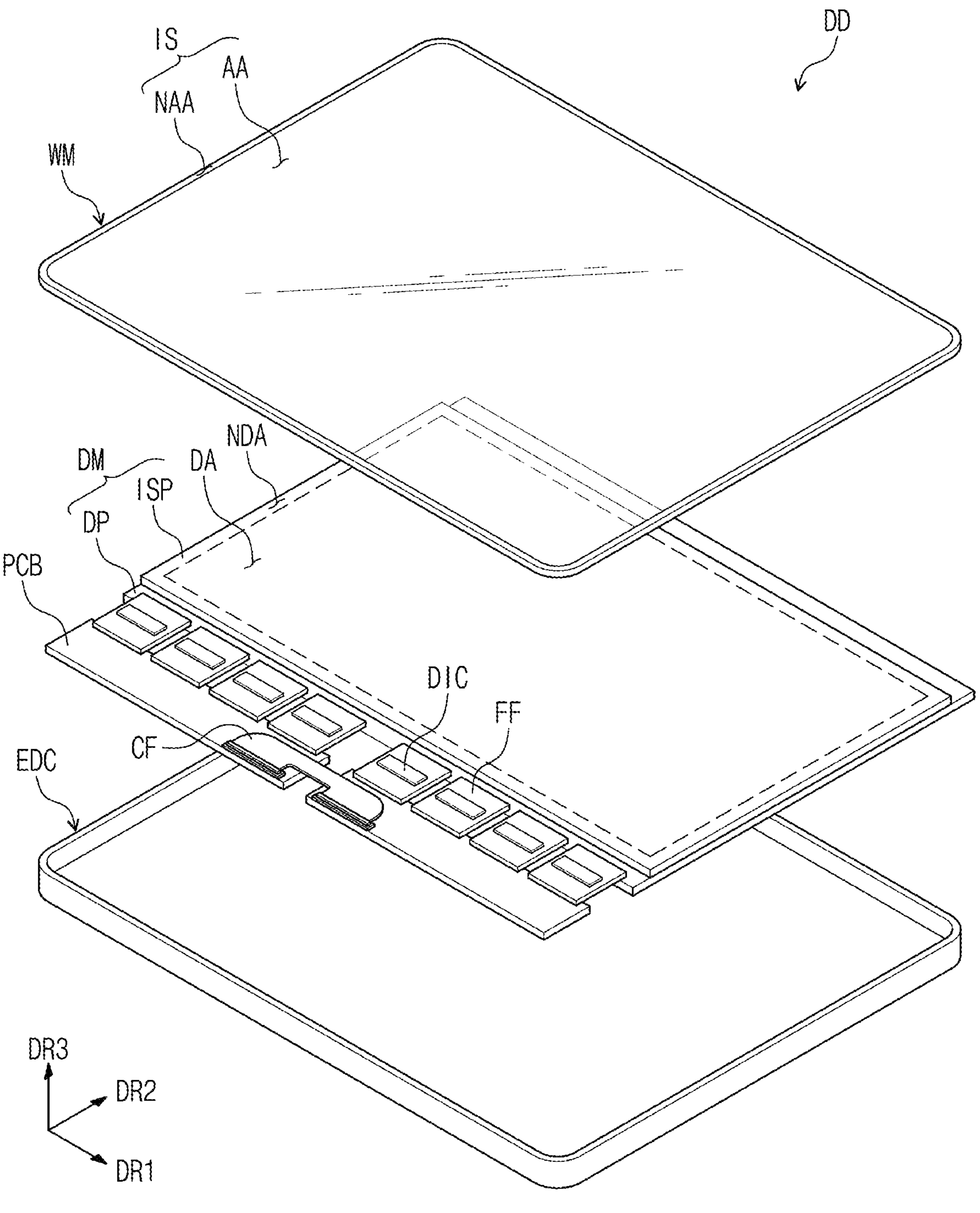
FIG. 2 is an exploded perspective view of an embodiment of a display device according to the disclosure.

FIG. 2 is an exploded perspective view of the display device DD according to the disclosure.

Referring to FIG. 2, the display device DD may include the display module DM and the window WM disposed on the display module DM. The display module DM may include a display panel DP and an input sensing layer ISP.

The display panel DP may be a light-emitting type display panel. In an embodiment, the display panel DP may be an organic light-emitting display panel, an inorganic light-emitting display panel, or a quantum dot light-emitting display panel. A light-emitting layer of the organic light-emitting display panel may include an organic light-emitting material. A light-emitting layer of the inorganic light-emitting display panel may include an inorganic light-emitting material. A light-emitting layer of the quantum dot light-emitting display panel may include a quantum dot or a quantum rod.

The display panel DP may output the image IM, and the output image IM may be displayed through the display surface IS.

The input sensing layer ISP may be disposed on the display panel DP and may sense the external input. The input sensing layer ISP may be disposed directly on the display panel DP. In the illustrated embodiment, the input sensing layer ISP may be formed on the display panel DP through successive processes. That is, when the input sensing layer ISP is disposed directly on the display panel DP, an inner adhesive film may not be disposed between the input sensing layer ISP and the display panel DP. However, the inner adhesive film may be disposed between the input sensing layer ISP and the display panel DP. In this case, the input sensing layer ISP may not be manufactured through the successive processes with the display panel DP, and the input sensing layer ISP may be fixed to an upper surface of the display panel DP by the inner adhesive film after being manufactured through a separate process.

Although not shown in FIG. 2, the non-effective area NAA of the display device DD may be provided as an area obtained by printing a material having a predetermined color on an area of the window WM. In an embodiment, the window WM may include a light-blocking pattern to define the non-effective area NAA. The light-blocking pattern may be a colored organic layer and may be formed by a coating method.

The window WM may be coupled to the display module DM by an adhesive film. In an embodiment, the adhesive film may include an optically clear adhesive film ("OCA"). However, the adhesive film should not be limited thereto or thereby, and the adhesive film may include a conventional adhesive. In an embodiment, the adhesive film may include an optically clear resin ("OCR") or a pressure sensitive adhesive film ("PSA"), for example.

An anti-reflective layer may be further disposed between the window WM and the display module DM. The anti-reflective layer may reduce a reflectance with respect to an external light incident thereto from the above of the window WM. The anti-reflective layer according to the disclosure may include a retarder and a polarizer. The retarder may be a film type or liquid crystal coating type. The polarizer may be a film type or liquid crystal coating type. The film type polarizer and the film type retarder may include a stretching type synthetic resin film, and the liquid crystal coating type polarizer and the liquid crystal coating type retarder may include liquid crystals aligned in a predetermined alignment. The retarder and the polarizer may be implemented as one polarizing film.

In an embodiment, the anti-reflective layer may include color filters. An arrangement of the color filters may be determined by taking into account colors of lights generated by pixels PX (refer to FIG. 3) included in the display panel DP. In this case, the anti-reflective layer may further include a light-blocking pattern disposed between the color filters.

The display module DM may display the image IM in response to electrical signals and may transmit/receive information on the external input. The display module DM may include a display area DA and a non-display area NDA, which are defined therein. The display area DA may be defined as an area through which the image IM provided from the display panel DP exits, i.e., an area through which the image IM is displayed. In addition, the display area DA may be defined as an area where the input sensing layer ISP senses the external input applied thereto from the outside. In an embodiment, the display area DA of the display module DM may correspond to or overlap at least a portion of the effective area AA.

The non-display area NDA may be defined adjacent to the display area DA. The non-display area NDA may be an area where the image IM is not displayed. In an embodiment, the non-display area NDA may surround the display area DA, for example. However, this is merely one of embodiments, and the non-display area NDA may be defined in various shapes and should not be particularly limited. According to the embodiment, the non-display area NDA of the display module DM may correspond to or overlap at least a portion of the non-effective area NAA.

The display device DD may further include a plurality of flexible films FF. A data driver DIC may be disposed (e.g., mounted) on each of the flexible films FF. In an embodiment, the data driver DIC may be provided in plural, and the data driver DIC may be disposed (e.g., mounted) on the flexible films FF, respectively.

The display device DD may further include at least one circuit board PCB coupled with the flexible films FF. FIG. 2 shows a structure in which the display device DD includes two circuit boards PCB, however, the number of the circuit boards PCB should not be limited to two. Among the circuit boards PCB, two circuit boards PCB adjacent to each other may be electrically connected to each other by a connection film CF. In addition, at least one of the circuit boards PCB may be electrically connected to a main board. A timing controller TCON (refer to FIG. 3) may be disposed (e.g., mounted) on the circuit boards PCB.

FIG. 2 shows a structure in which the data driver DIC are respectively disposed (e.g., mounted) on the flexible films FF, however, the disclosure should not be limited thereto or thereby. In an embodiment, the data driver DIC may be directly disposed (e.g., mounted) on the display panel DP. In this case, portions of the display panel DP on which the data driver DIC are disposed (e.g., mounted) may be bent and may be disposed on a rear surface of the display device DD.

The input sensing layer ISP may be electrically connected to the circuit board PCB via the flexible films FF, however, the disclosure should not be limited thereto or thereby. That is, the display module DM may further include a separate flexible film to electrically connect the input sensing layer ISP to the circuit board PCB.

The housing EDC may absorb impacts applied thereto from the outside and may prevent foreign substances/moisture from entering the display module DM to protect components accommodated in the housing EDC. In an embodiment, the housing EDC may be obtained by assembling a plurality of accommodating members.

The display device DD may further include an electronic module that includes various functional modules to operate the display module DM, a power supply module, e.g., a battery, supplying a power source desired for an overall operation of the display device DD, and a bracket coupled with the display module DM and/or the housing EDC to divide an inner space of the display device DD.

Figure 3:
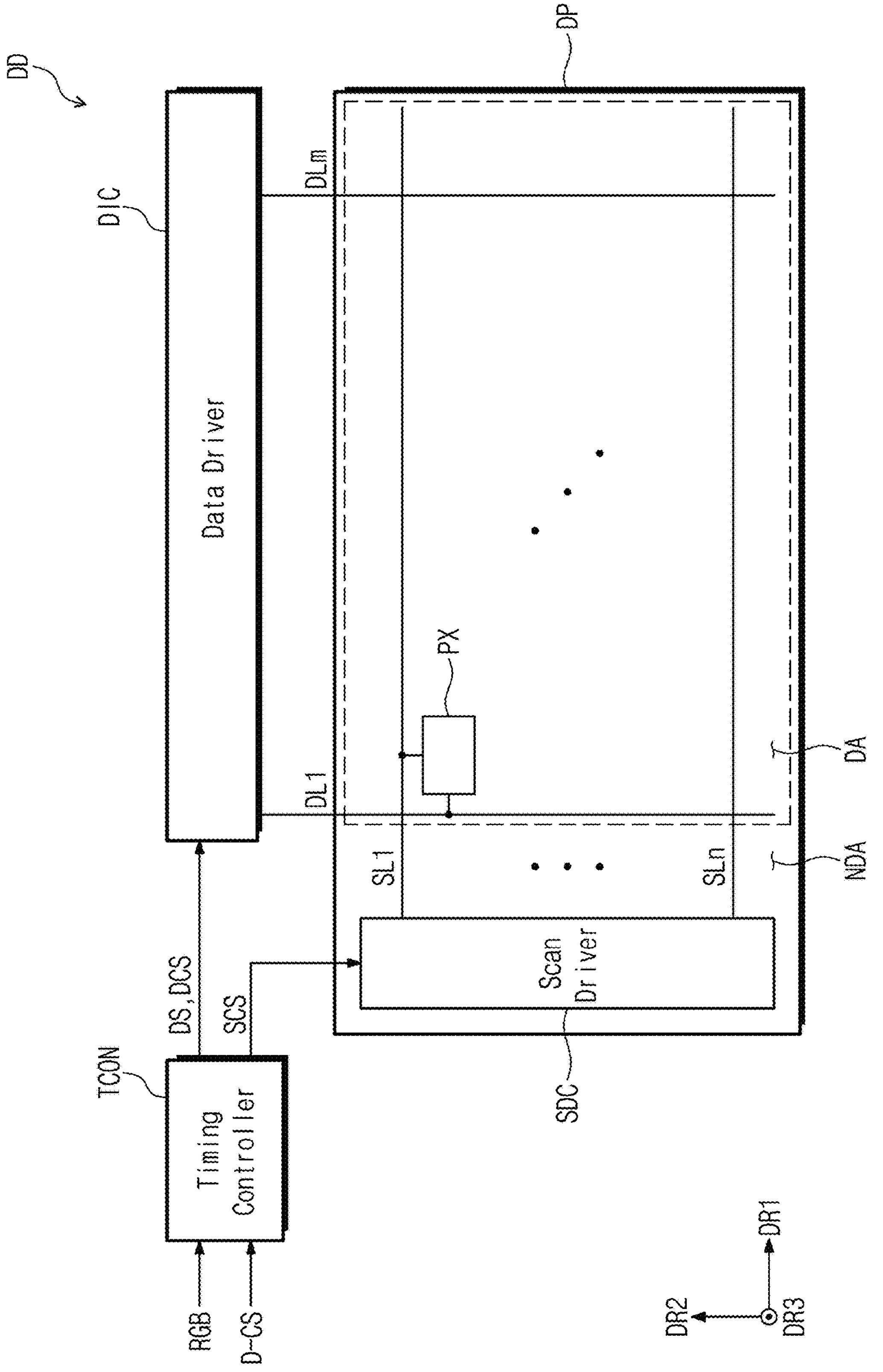
FIG. 3 is a block diagram of an embodiment of a display device according to the disclosure.

FIG. 3 is a block diagram of an embodiment of the display device DD according to the disclosure.

Referring to FIG. 3, the display device DD may include the display panel DP, the timing controller TCON, and the data driver DIC.

The timing controller TCON may receive input data RGB and control signals D-CS from an external controller (not shown). In an embodiment, the external controller (not shown) may be a graphics processing unit ("GPU"). The control signals D-CS may include various signals. In an embodiment, the control signals D-CS may include an input vertical synchronization signal, an input horizontal synchronization signal, a main clock, and a data enable signal.

The timing controller TCON may convert a data format of the input data RGB to a data format appropriate to an interface between the data driver DIC and the timing controller TCON and may generate image data DS. In this case, the timing controller TCON may perform an operation of compensating an image retention to generate the image data DS. The timing controller TCON may generate a representative compensation value for each of a plurality of blocks BLK (refer to FIG. 4). This will be described in detail later.

The timing controller TCON may generate a scan control signal SCS, a data control signal DCS, and a flag signal FG (refer to FIG. 5) based on the control signals D-CS.

The data driver DIC may output grayscale voltages in response to the data control signal DCS and the image data DS from the timing controller TCON to drive a plurality of data lines DL1 to DLm. Here, m is a natural number. The data driver DIC may be implemented in an integrated circuit and may be directly disposed (e.g., mounted) on a predetermined portion of the display panel DP or may be electrically connected to the display panel DP after being disposed (e.g., mounted) on a separate printed circuit board by a chip-on-film method, but it should not be particularly limited. In an embodiment, the data driver DIC may be formed through the same process as a circuit layer of the display panel DP.

The display panel DP may include the display area DA and the non-display area NDA. The pixels PX may be arranged in the display area DA, and a scan driver SDC may be disposed in the non-display area NDA.

The display panel DP may include a plurality of scan lines SL1 to SLn, the data lines DL1 to DLm, the pixels PX, and the scan driver SDC. Each of the pixels PX may be connected to a corresponding data line among the data lines DL1 to DLm and a corresponding scan line among the scan lines SL1 to SLn. Here, n is a natural number. The display panel DP may further include light emission control lines (not shown), and the display device DD may further include a light emission driver (not shown) that applies control signals to the light emission control lines. The configurations of the display panel DP should not be particularly limited.

The scan lines SL1 to SLn may extend in a direction parallel to the first direction DR1 and may be substantially parallel to each other. The scan lines SL1 to SLn may be arranged spaced apart from each other in the second direction DR2. The data lines DL1 to DLm may extend from the data driver DIC to a direction parallel to the second direction DR2 and may be substantially parallel to each other. The data lines DL1 to DLm may be arranged spaced apart from each other in the first direction DR1.

The pixels PX may be electrically connected to the scan lines SL1 to SLn and the data lines DL1 to DLm. In an embodiment, the pixels arranged in a first row may be connected to the scan line SL1, and the pixels arranged in a first column may be connected to the data line DL1.

The scan driver SDC may drive the scan lines SL1 to SLn in response to the scan control signal SCS. The scan driver SDC may be formed through the same process as the circuit layer of the display panel DP, however, it should not be limited thereto or thereby. In an embodiment, the scan driver SDC may be implemented in an integrated circuit and may be directly disposed (e.g., mounted) on a predetermined portion of the display panel DP or may be electrically connected to the display panel DP after being disposed (e.g., mounted) on a separate printed circuit board by a chip-on-film method.

Figure 4:
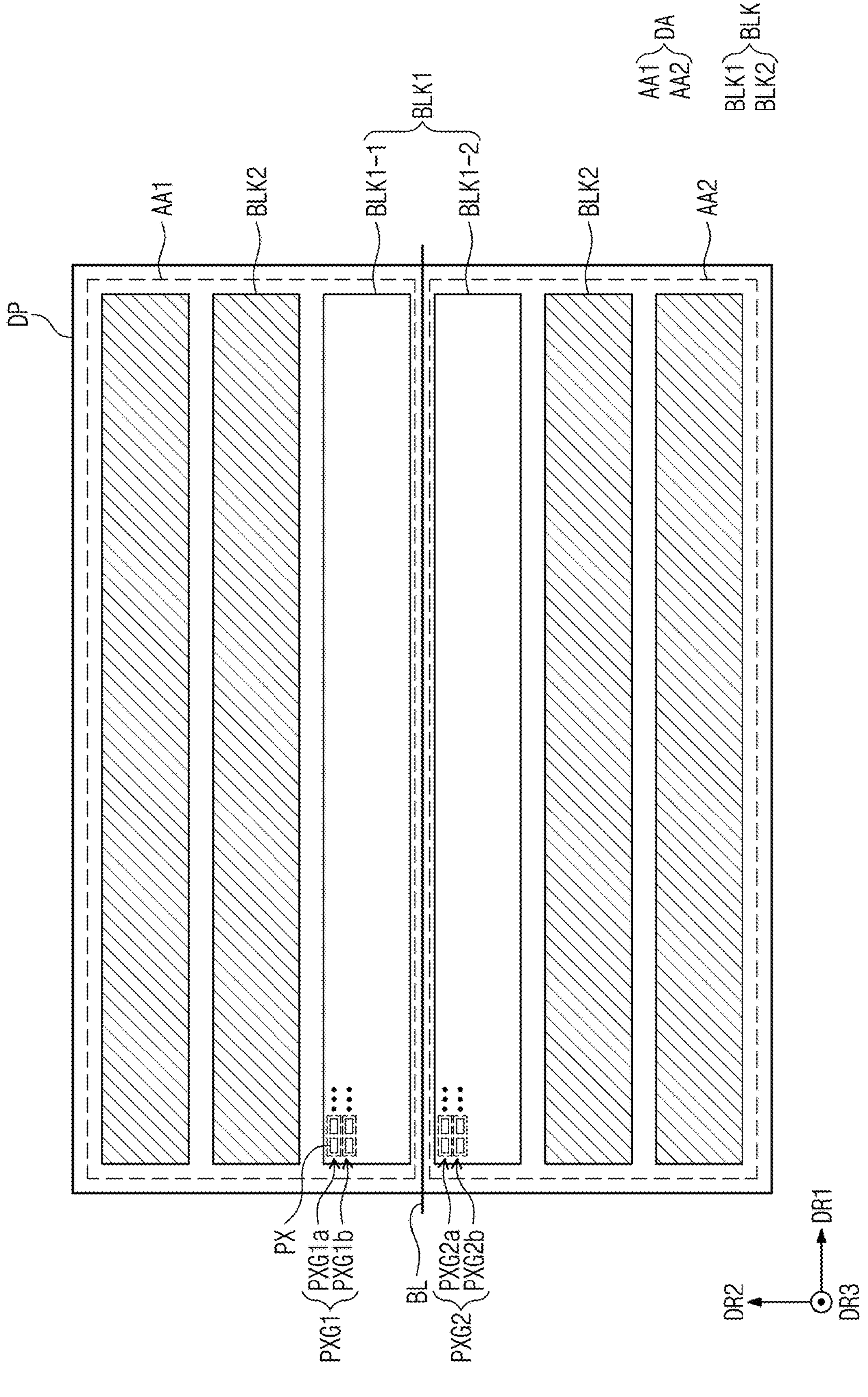
FIG. 4 is a plan view of an embodiment of a display area of a display panel in a second mode according to the disclosure.

FIG. 4 is a plan view of an embodiment of the display area of the display panel DP in the second mode according to the disclosure. FIG. 4 shows a structure in which a boundary line BL is defined between two blocks without overlapping the blocks in the second mode.

Referring to FIGS. 3 and 4, the display area DA may be defined in the display panel DP. The display area DA may include the first area AA1 and the second area AA2 spaced apart from the first area AA1 in the direction opposite to the second direction DR2. The boundary line BL may be defined between the first area AA1 and the second area AA2.

The first image IM1 (refer to FIG. 1B) may be displayed through the first area AA1, and the second image IM2 (refer to FIG. 1B) different from the first image IM1 may be displayed through the second area AA2. In an embodiment, the second image IM2 (refer to FIG. 1B) may be the black image.

The display panel DP may include the plural blocks BLK. Each of the blocks BLK may extend in the first direction DR1. The blocks BLK may be arranged in the second direction DR2. Each of the blocks BLK may include the plural pixels PX. Each of the blocks BLK may include a plurality of pixel rows arranged in the first direction DR1. The display area DA may be defined by the blocks BLK.

The blocks BLK may include at least one first block BLK1 and at least one second block BLK2. The first block BLK1 may be disposed adjacent to the boundary line BL, and the second block BLK2 may be spaced apart from the boundary line BL. Each of the first block BLK1 and the second block BLK2 may be provided in plural. The first blocks BLK1 may be disposed between the second blocks BLK2. In FIG. 4, blocks disposed at a third position and a fourth position among the blocks BLK are shown as the first blocks BLK1, and blocks disposed at first, second, fifth, and sixth positions among the blocks BLK are shown as the second blocks BLK2.

The first blocks BLK1 may include a first-first block BLK1-1 and a first-second block BLK1-2. The first-second block BLK1-2 may be spaced apart from the first-first block BLK1-1 with the boundary line BL interposed therebetween. The first-first block BLK1-1 may be disposed in the first area AA1, and the first-second block BLK1-2 may be disposed in the second area AA2.

The timing controller TCON may generate the representative compensation value with respect to each of the blocks BLK. In the illustrated embodiment, when the timing controller TCON performs the image retention compensation processing on the input data RGB, the timing controller TCON may use the representative compensation value compensated in a unit at block-wise level (hereinafter, also referred to as a block unit). The representative compensation value may be a basic compensation value for a luminance difference in each block unit. An amount of calculations processed by the timing controller TCON may be reduced by the representative compensation value. Accordingly, a display quality and a reliability of the display device DD may be improved.

The timing controller TCON may generate the flag signal FG (refer to FIG. 5) with respect to the first blocks BLK1. That is, the timing controller TCON may generate the flag signal FG (refer to FIG. 5) with respect to each of the first-first block BLK1-1 and the first-second block BLK1-2. The flag signal FG (refer to FIG. 5) may be a signal to define the first blocks BLK1 in which the boundary line BL is defined among the blocks BLK.

The timing controller TCON may divide both the first-first block BLK1-1 and the first-second block BLK1-2 in a first unit. The first unit may be defined as a unit at pixel-wise level (hereinafter, also referred to as a pixel unit) that includes at least one pixel of the pixels PX. The pixel unit may include a plurality of first pixel units PXG1 and a plurality of second pixel units PXG2.

The first pixel units PXG1 each including at least one pixel of the pixels PX may be defined in the first-first block BLK1-1. Each of the first pixel units PXG1 may include a first-first pixel unit PXG1*a* and a first-second pixel unit PXG1*b*. FIG. 4 shows a structure in which two pixels PX are grouped into one pixel unit PXG1*a* or PXG1*b* as an illustrative embodiment, however, the number of the pixels included in one pixel unit PXG1*a* or PXG1*b* should not be limited thereto or thereby.

The second pixel units PXG2 each including at least one pixel of the pixels PX may be defined in the first-second block BLK1-2. The second pixel units PXG2 may include a second-first pixel unit PXG2*a* and a second-second pixel unit PXG2*b*.

Figure 5:
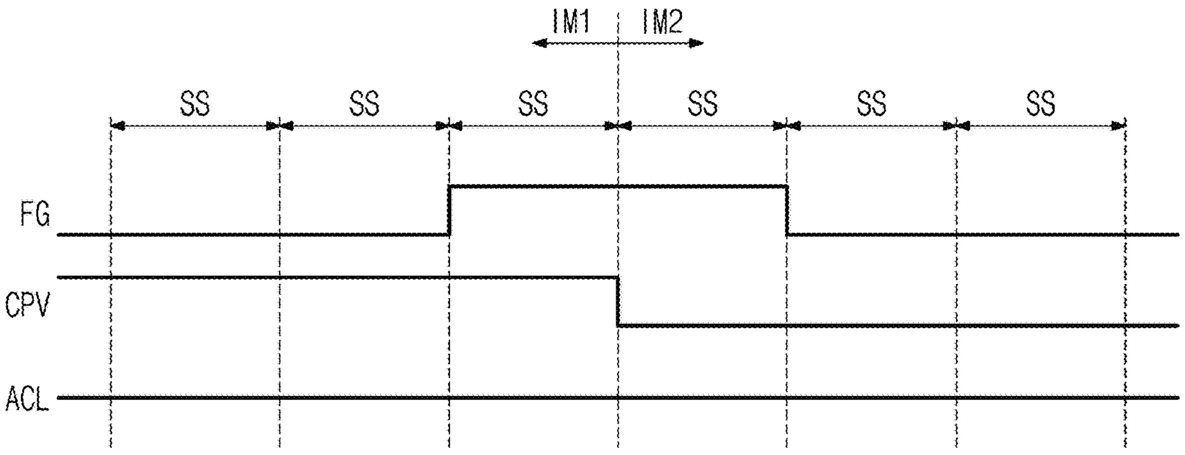
FIG. 5 is a timing diagram of an embodiment of a display device according to the disclosure.

FIG. 5 is a timing diagram of an embodiment of the display device according to the disclosure.

Referring to FIGS. 3 to 5, the timing controller TCON may generate a compensation value CPV with respect to each of the blocks BLK.

As shown in the timing diagram of FIG. 5, the blocks BLK may operate in sequential response to a plurality of periods SS, respectively. In an embodiment, the block at the first position among the blocks BLK may operate corresponding to a first period of the periods SS. The block at the second position among the blocks BLK may operate corresponding to a second period of the periods SS. The block at the third position among the blocks BLK may operate corresponding to a third period of the periods SS. The block at the fourth position among the blocks BLK may operate corresponding to a fourth period of the periods SS. The block at the fifth position among the blocks BLK may operate corresponding to a fifth period of the periods SS. The block at the sixth position among the blocks BLK may operate corresponding to a sixth period of the periods SS.

The timing controller TCON may output the image data DS obtained by reflecting the compensation value CPV in the input data RGB to the data driver DIC. The compensation value CPV may include a first compensation value and a second compensation value generated by a method different from a method of generating the first compensation value.

The flag signal FG may be in an active state in periods corresponding to the first blocks BLK1 and may be in an inactive state in periods corresponding to the second block BLK2.

The timing controller TCON may generate the first compensation value with respect to the first blocks BLK1 based on the flag signal FG. When the flag signal FG is in the active state, the timing controller TCON may generate the first compensation value with respect to a corresponding block (the first block BLK1) among the blocks BLK in the first unit.

The timing controller TCON may generate a plurality of first pixel compensation values with respect to the first pixel units PXG1 of the first-first block BLK1-1. The timing controller TCON may calculate a first average value of the first pixel compensation values. The timing controller TCON may generate the first average value as the first compensation value applied to the first-first block BLK1-1.

The timing controller TCON may generate a plurality of second pixel compensation values with respect to the second pixel units PXG2 of the first-second block BLK1-2. The timing controller TCON may calculate a second average value of the second pixel compensation values. The timing controller TCON may generate the second average value as the second compensation value applied to the first-second block BLK1-2.

In this case, the first average value may be different from the second average value. In an embodiment, the first average value used to compensate for the first-first block BLK1-1 in which the first image IM1 including a normal image (or a predetermined display image) is displayed may be greater than the second average value used to compensate the first-second block BLK1-2 in which the second image IM2 including the black image is displayed.

That is, when the compensation operation for the image retention of the input data RGB is performed in the first blocks BLK1 adjacent to the boundary line BL, the timing controller TCON may compensate for the first blocks BLK1 in the pixel unit that is the first unit.

The timing controller TCON may generate the second compensation value with respect to the second block BLK2 based on the flag signal FG. When the flag signal FG is in the inactive state, the timing controller TCON may generate the second compensation value with respect to a corresponding block (the second block BLK2), among the blocks BLK, in a second unit different from the first unit. In this case, the second unit may be greater than the first unit.

The timing controller TCON may generate the second compensation value using a representative compensation value of one block among the second blocks BLK2 and a representative compensation value of another block adjacent to the one block among the blocks BLK.

The second compensation value may be generated by adding a value obtained by interpolating the representative compensation value of other blocks adjacent to the second block BLK2 among the blocks BLK to the representative compensation values of the second block BLK2. In an embodiment, when the block BLK at the second position is the second block BLK2 in FIG. 4, a value obtained by adding the representative compensation value of the block BLK at the second position and an average value of the representative compensation values of the blocks BLK at the first and third positions may be generated as the second compensation value.

That is, when the compensation operation of the image retention of the input data RGB is performed in the second blocks BLK2 spaced apart from the boundary line BL, the timing controller TCON may compensate for the second blocks BLK2 in the block unit that is the second unit.

Different from the disclosure, the timing controller may generate the compensation value by interpolating the representative compensation value of each of the blocks BLK and the representative compensation value of other blocks BLK adjacent thereto. Since the predetermined image is displayed as the first image IM1 and the black image is displayed as the second image IM2 based on the boundary line BL, when the compensation value is generated through the interpolation processing in the block BLK adjacent to the boundary line BL, the compensation value, which is interpolated by the compensation value of the second image IM2, in the first area AA1 adjacent to the boundary line BL may be reduced, and the image retention may occur in the display panel. However, according to the disclosure, the timing controller TCON may generate the first compensation value in the pixel unit with respect to the first blocks BLK1 adjacent to the boundary line BL and may generate the second compensation value in the block unit with respect to the second blocks BLK2 spaced apart from the boundary line BL. The compensation operation may be performed in the pixel unit in the blocks adjacent to the boundary line BL, and thus, the compensation value may be prevented from being reduced in the first area AA1 adjacent to the boundary line BL. Accordingly, the image retention occurring in the display panel DP may be reduced or prevented. Thus, the display device DD with improved display quality may be provided.

The timing controller TCON may output the image data DS obtained by reflecting the first compensation value and the second compensation value in the input data RGB to the data driver DIC. The data driver DIC may apply a voltage to the first blocks BLK1 based on the first compensation value and may apply a voltage to the second blocks BLK2 based on the second compensation value. That is, the input data RGB may be compensated using the first compensation value in portions of the display area DA, which are adjacent to the boundary line, and the input data RGB may be compensated using the second compensation value in portions of the display area DA, which are spaced apart from the boundary line.

An after-compensation brightness value ACL may be a brightness value of the image data DS in which the first compensation value and the second compensation value are reflected. The after-compensation brightness value ACL may be uniform in the periods SS. That is, the first image IM1 and the second image IM2, which are displayed in the display panel DP, may have the uniform brightness.

According to the disclosure, the timing controller TCON may generate the first compensation value and the second compensation value with respect to the blocks BLK in the periods SS. The timing controller TCON may display the image through the display panel DP based on the image data DS in which the first compensation value and the second compensation value are reflected. The after-compensation brightness value ACL of the image data DS output to the blocks BLK corresponding to the periods SS may be uniform. Accordingly, the image retention occurring in the display panel DP may be reduced or prevented. Thus, the display device DD with improved display quality may be provided.

Figure 6:
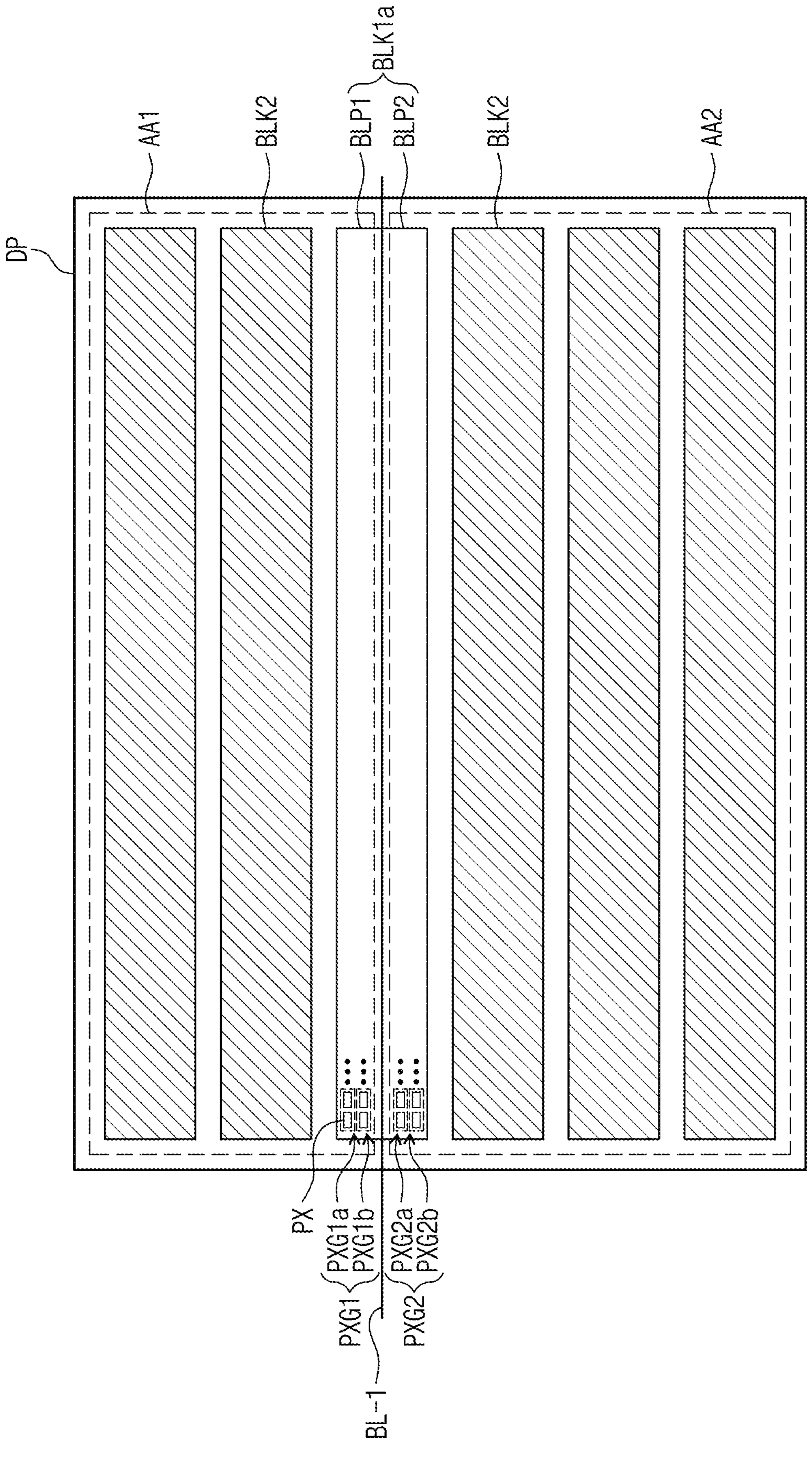
FIG. 6 is a plan view of an embodiment of a display area of a display panel in a second mode according to the disclosure.

FIG. 6 is a plan view of an embodiment of a display area of a display panel in a second mode according to the disclosure. In FIG. 6, the same reference numerals denote the same elements in FIG. 4, and thus, detailed descriptions of the same elements are omitted. FIG. 6 shows a structure in which a boundary line BL-1 overlaps one block in the second mode.

Referring to FIGS. 3 and 6, the display panel DP may include a plurality of blocks BLK. The blocks BLK may include at least one first block BLK1*a* and at least one second block BLK2. The first block BLK1*a* may overlap the boundary line BL-1, and the second block BLK2 may be spaced apart from the boundary line BL-1. The second block BLK2 may be provided in plural. The first block BLK1*a* may be disposed between the second blocks BLK2. In FIG. 6, a block disposed at a third position among the blocks BLK is shown as the first block BLK1*a*, and blocks disposed at first, second, fourth, fifth, and sixth positions among the blocks BLK are shown as the second blocks BLK2.

The first block BLK1*a* may include a first block portion BLP1 and a second block portion BLP2. The second block portion BLP2 may be spaced apart from the first block portion BLP1 with the boundary line BL-1 interposed therebetween. The first block portion BLP1 may be disposed in a first area AA1, and the second block portion BLP2 may be disposed in a second area AA2.

The timing controller TCON may generate a flag signal FG-1 (refer to FIG. 7) with respect to the first block BLK1*a*. The flag signal FG-1 (refer to FIG. 7) may be a signal to define at least one first block BLK1*a*, which is an area where the boundary line BL-1 is generated, among the blocks BLK.

The timing controller TCON may divide the first block portion BLP1 and the second block portion BLP2 in a first unit. The first unit may be defined as a pixel unit that includes at least one pixel of the pixels PX. The pixel unit may include a plurality of first pixel units PXG1 and a plurality of second pixel units PXG2.

The first pixel units PXG1 each including at least one pixel among the pixels PX may be defined in the first block portion BLP1. Each of the first pixel units PXG1 may include a first-first pixel unit PXG1*a* and a first-second pixel unit PXG1*b*. FIG. 6 shows a structure in which two pixels PX are grouped into one pixel unit PXG1*a* or PXG1*b* as an illustrative embodiment, however, the number of the pixels included in one pixel unit PXG1*a* or PXG1*b* should not be limited thereto or thereby.

The second pixel units PXG2 each including at least one pixel among the pixels PX may be defined in the second block portion BLP2. The second pixel units PXG2 may include a second-first pixel unit PXG2*a* and a second-second pixel unit PXG2*b*.

Figure 7:
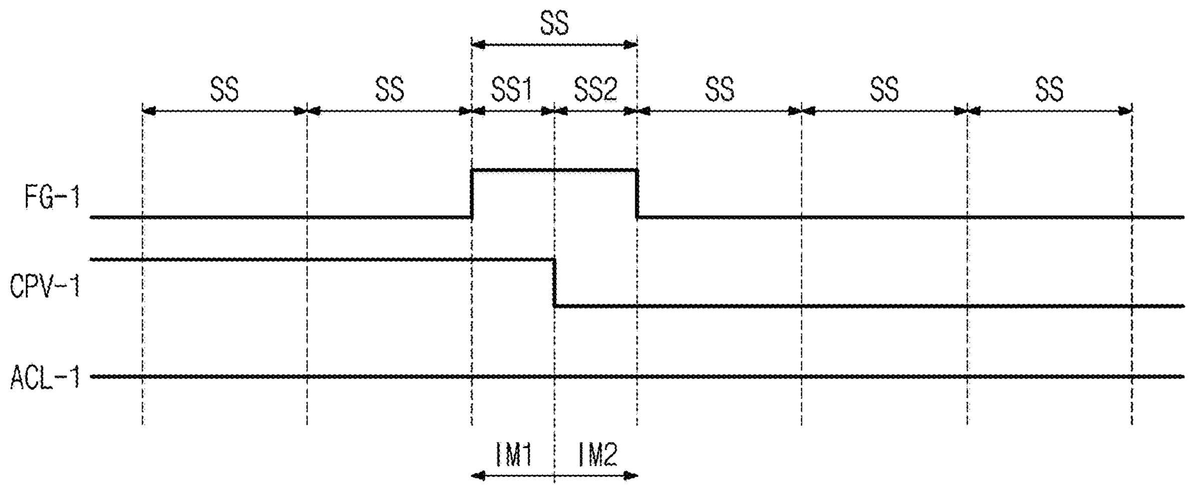
FIG. 7 is a timing diagram of an embodiment of a display device according to the disclosure.

FIG. 7 is a timing diagram of an embodiment of the display device according to the disclosure.

Referring to FIGS. 3, 6, and 7, the timing controller TCON may generate a compensation value CPV-1 with respect to each of the blocks BLK.

As shown in the timing diagram of FIG. 7, the blocks BLK may operate corresponding to a plurality of periods SS, respectively.

The timing controller TCON may output image data DS obtained by reflecting the compensation value CPV-1 in the input data RGB to the data driver DIC. The compensation value CPV-1 may include a first compensation value and a second compensation value generated by a method different from a method of generating the first compensation value.

The flag signal FG-1 may be in an active state in periods corresponding to the first block BLK1*a* and may be in an inactive state in periods corresponding to the second blocks BLK2.

A period among the periods SS, which corresponds to the first block BLK1*a*, may include a first period SS1 and a second period SS2. The timing controller TCON may generate the first compensation value with respect to the first block BLK1*a* based on the flag signal FG-1 during the first period SS1 and the second period SS2. When the flag signal FG-1 is in the active state, the timing controller TCON may generate the first compensation value with respect to a corresponding block (the first block BLK1*a*) among the blocks BLK in the first unit.

The timing controller TCON may generate a plurality of first pixel compensation values with respect to the first pixel units PXG1 of the first block portion BLP1, respectively, during the first period SS1. The timing controller TCON may calculate a first average value of the first pixel compensation values. The timing controller TCON may generate the first average value during the first period SS1 as the first compensation value applied to the first block portion BLP1.

The timing controller TCON may generate a plurality of second pixel compensation values with respect to the second pixel units PXG2 of the second block portion BLP2, respectively, during the second period SS2. The timing controller TCON may calculate a second average value of the second pixel compensation values. The timing controller TCON may generate the second average value during the second period SS2 as the first compensation value applied to the second block portion BLP2.

In this case, the first average value may be different from the second average value. In an embodiment, the first average value used to compensate for the first block portion BLP1 in which the first image IM1 including a normal image (or a predetermined display image) is displayed may be greater than the second average value used to compensate for the second block portion BLP2 in which the second image IM2 including the black image is displayed.

That is, when the compensation operation for the image retention of the input data RGB is performed in the first block BLK1*a* adjacent to the boundary line BL-1, the timing controller TCON may compensate for the first blocks BLK1*a* in the pixel unit that is the first unit.

The timing controller TCON may generate the second compensation value with respect to the second block BLK2 based on the flag signal FG-1. When the flag signal FG-1 is in the inactive state, the timing controller TCON may generate the second compensation value with respect to a corresponding block (the second block BLK2), among the blocks BLK, in a second unit different from the first unit. In this case, the second unit (a block unit) may be greater than the first unit.

The timing controller TCON may generate the second compensation value using a representative compensation value of one block that is compensated among the second blocks BLK2 and a representative compensation value of another block adjacent to the one block among the blocks BLK, and/or the first compensation value.

The second compensation value may be generated by adding the representative compensation value of the second block BLK2 and a value obtained by interpolating representative compensation values of other blocks adjacent to the second block BLK2 among the blocks BLK or a value obtained by interpolating the representative compensation value of other blocks and the first compensation value. In an embodiment, when the block BLK at the second position is the second block BLK2, a value obtained by adding the representative compensation value of the block BLK at the second position and an average value of the representative compensation value of the block BLK at the first position and the first compensation value of the first block portion BLP1 may be generated as the second compensation value. When the block BLK at the fourth position is the second block BLK2, a value obtained by adding the representative compensation value of the block BLK at the fourth position and an average value of the first compensation value of the second block portion BLP2 and the representative compensation value of the block BLK at the fifth position may be generated as the second compensation value.

When the block BLK at the fifth position is the second block BLK2, a value obtained by adding the representative compensation value of the block BLK at the fifth position and an average value of the representative compensation values of the blocks BLK at the fourth and sixth positions may be generated as the second compensation value.

The timing controller TCON may output the image data DS obtained by reflecting the first compensation value and the second compensation value in the input data RGB to the data driver DIC. The data driver DIC may output a voltage to the first block BLK1*a* based on the first compensation value and may output a voltage to the second block BLK2 based on the second compensation value. That is, the input data RGB may be compensated using the first compensation value in portions of the display area DA, which are adjacent to the boundary line BL-1, and the input data RGB may be compensated using the second compensation value in portions of the display area DA, which are spaced apart from the boundary line BL-1.

An after-compensation brightness value ACL-1 may be a brightness value of the image data DS in which the first compensation value and the second compensation value are reflected. The after-compensation brightness value ACL-1 may be uniform in the periods SS. That is, the first image IM1 and the second image IM2, which are displayed in the display panel DP, may have the uniform brightness.

According to the disclosure, the timing controller TCON may generate the first compensation value and the second compensation value with respect to the blocks BLK in the periods SS. The timing controller TCON may display the image through the display panel DP based on the image data DS in which the first compensation value and the second compensation value are reflected. The after-compensation brightness value ACL-1 of the image data DS output to the blocks BLK corresponding to the periods SS may be uniform. Accordingly, the image retention occurring in the display panel DP may be reduced or prevented. Thus, the display device DD with improved display quality may be provided.

Figure 8:
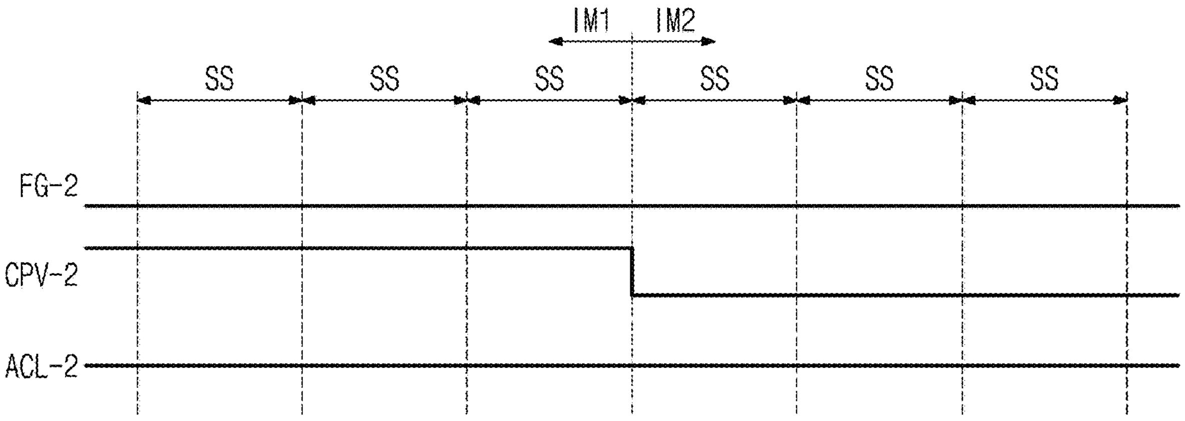
FIG. 8 is a timing diagram of an embodiment of a display device according to the disclosure.

FIG. 8 is a timing diagram of an embodiment of a display device according to the disclosure.

Referring to FIGS. 3, 4, and 8, the timing controller TCON may generate a compensation value CPV-2 of each of blocks BLK.

In the timing diagram shown in FIG. 8, the blocks BLK may operate to correspond to periods SS, respectively.

The timing controller TCON may output image data DS obtained by reflecting the compensation value CPV-2 in the input data RGB to the data driver DIC. The compensation value CPV-2 may include a first compensation value and a second compensation value generated by a method different from a method of generating the first compensation value.

A flag signal FG-2 may be in an inactive state in the periods SS.

The timing controller TCON may generate a representative compensation value with respect to each of the first blocks BLK1 based on the flag signal FG-2. When the flag signal FG-2 is in the inactive state, the timing controller TCON may generate the representative compensation value with respect to the first blocks BLK1.

The timing controller TCON may generate a representative compensation value with respect to a first-first block BLK1-1. The timing controller TCON may generate the representative compensation value as the first compensation value applied to the first-first block BLK1-1.

The timing controller TCON may generate a representative compensation value with respect to a first-second block BLK1-2. The timing controller TCON may generate the representative compensation value as the first compensation value applied to the first-second block BLK1-2.

In this case, the representative compensation value of the first-first block BLK1-1 may be different from the representative compensation value of the first-second block BLK1-2. In an embodiment, the representative compensation value used to compensate for the first-first block BLK1-1 in which a first image IM1 including a normal image (or a predetermined display image) is displayed may be greater than the representative compensation value used to compensate the first-second block BLK1-2 in which a second image IM2 including a black image is displayed.

That is, the timing controller TCON may generate the first compensation value of the first-first block BLK1-1 using only the representative compensation value of the first-first block BLK1-1 and may generate the first compensation value of the first-second block BLK1-2 using only the representative compensation value of the first-second block BLK1-2.

The timing controller TCON may generate the second compensation value with respect to the second block BLK2 based on the flag signal FG-2. The timing controller TCON may generate the second compensation value using a representative compensation value of one block among the second blocks BLK2 and a representative compensation value of another block adjacent to the one block among the blocks BLK.

The second compensation value may be generated by adding the representative compensation value of the second block BLK2 and a value obtained by interpolating representative compensation values of other blocks adjacent to the second block BLK2 among the blocks BLK. In an embodiment, when the block BLK at the second position is the second block BLK2 as shown in FIG. 4, a value obtained by adding the representative compensation value of the block BLK at the second position and an average value of the representative compensation values of the blocks BLK at the first and third positions may be generated as the second compensation value.

Different from the disclosure, the timing controller may generate the compensation value by interpolating the representative compensation value of each of the blocks BLK and the representative compensation value of other blocks BLK adjacent thereto. Since the predetermined image is displayed as the first image IM1 and the black image is displayed as the second image IM2 based on the boundary line BL, when the compensation value is generated through the interpolation processing in the block BLK adjacent to the boundary line BL, the compensation value, which is interpolated by the compensation value of the second image IM2, in the first area AA1 adjacent to the boundary line BL may be reduced, and the image retention may occur in the display panel. However, according to the disclosure, the timing controller TCON may generate the first compensation value with respect to the first blocks BLK1 adjacent to the boundary line BL using only the representative compensation value of each of the first blocks BLK1 and may generate the second compensation value with respect to the second block BLK2 spaced apart from the boundary line BL using the representative compensation value of one block of the second blocks BLK2 and the representative compensation value of another block of the blocks BLK, which is adjacent to the one block. The compensation operation may be performed in the blocks adjacent to the boundary line BL without performing the interpolation processing, and thus, the compensation value may be prevented from being reduced in the first area AA1 adjacent to the boundary line BL. Accordingly, the image retention occurring in the display panel DP may be reduced or prevented. Thus, the display device DD with improved display quality may be provided.

The timing controller TCON may output the image data DS obtained by reflecting the first compensation value and the second compensation value in the input data RGB to the data driver DIC. The data driver DIC may apply a voltage to the first blocks BLK1 based on the first compensation value and may apply a voltage to the second blocks BLK2 based on the second compensation value. That is, the input data RGB may be compensated using the first compensation value in portions of the display area DA, which are adjacent to the boundary line, and the input data RGB may be compensated using the second compensation value in portions of the display area DA, which are spaced apart from the boundary line.

An after-compensation brightness value ACL-2 may be a brightness value of the image data DS in which the first compensation value and the second compensation value are reflected. The after-compensation brightness value ACL-2 may be uniform in the periods SS. That is, the first image IM1 and the second image IM2, which are displayed in the display panel DP, may have the uniform brightness.

According to the disclosure, the timing controller TCON may generate the first compensation value and the second compensation value with respect to the blocks BLK in the periods SS. The timing controller TCON may display the image through the display panel DP based on the image data DS in which the first compensation value and the second compensation value are reflected. The after-compensation brightness value ACL-2 of the image data DS output to the blocks BLK corresponding to the periods SS may be uniform. Accordingly, the image retention occurring in the display panel DP may be reduced or prevented. Thus, the display device DD with improved display quality may be provided.

Figure 9:
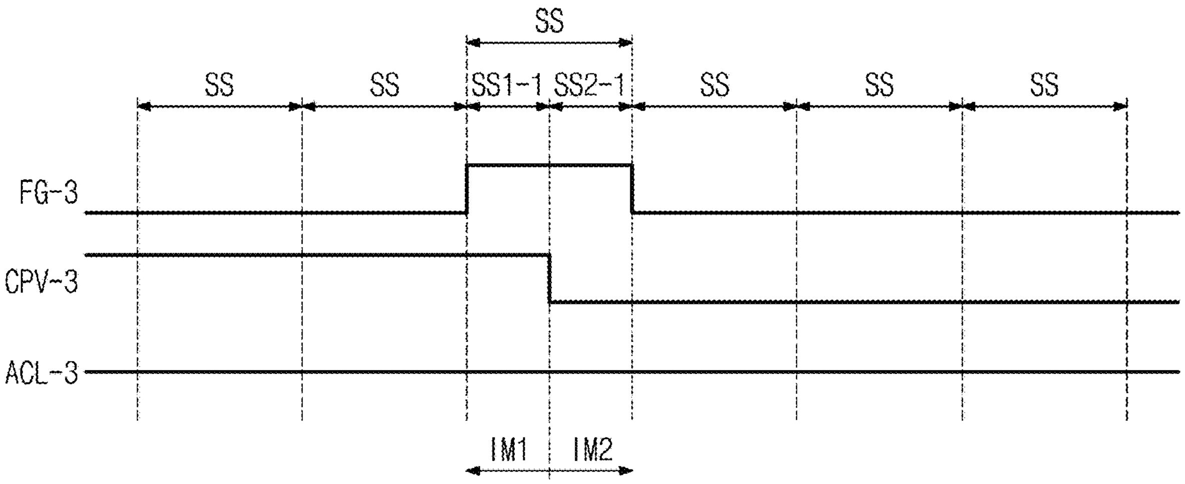
FIG. 9 is a timing diagram of an embodiment of a display device according to the disclosure.

FIG. 9 is a timing diagram of an embodiment of the display device according to the disclosure.

Referring to FIGS. 3, 6, and 9, the timing controller TCON may generate a compensation value CPV-3 of each of the blocks BLK.

In the timing diagram shown in FIG. 9, the blocks BLK may operate to correspond to periods SS, respectively.

The timing controller TCON may output image data DS obtained by reflecting the compensation value CPV-3 in the input data RGB to the data driver DIC. The compensation value CPV-3 may include a first compensation value and a second compensation value generated by a method different from a method of generating the first compensation value.

A period corresponding to the first block BLK1*a* may include a first period SS1-1 and a second period SS2-1. The timing controller TCON may generate a partial compensation value with respect to the first block BLK1*a* based on a flag signal FG-3 during the first period SS1-1 and the second period SS2-1. When the flag signal FG-3 is in an active state, the timing controller TCON may generate a partial compensation value of a corresponding block (the first block BLK1*a*) among the blocks BLK.

The timing controller TCON may generate a partial compensation value with respect to the first block portion BLP1 based on the flag signal FG-3 during the first period SS1-1. The timing controller TCON may generate the partial compensation value as the first compensation value applied to the first block portion BLP1 during the first period SS1-1.

The timing controller TCON may generate a partial compensation value with respect to the second block portion BLP2 based on the flag signal FG-3 during the second period SS2-1. The timing controller TCON may generate the partial compensation value as the first compensation value applied to the second block portion BLP2 during the second period SS2-1.

In this case, the first compensation value applied to the first block portion BLP1 may be different from the first compensation value applied to the second block portion BLP2. In an embodiment, the first compensation value applied to the first block portion BLP1 in which a first image IM1 including a normal image (or a predetermined display image) is displayed may be greater than the first compensation value applied to the second block portion BLP2 in which the second image IM2 including a black image is displayed.

The timing controller TCON may generate the second compensation value with respect to the second blocks BLK2 based on the flag signal FG-3. The timing controller TCON may generate the second compensation value using a representative compensation value of one block of the second block BLK2 that is compensated and a representative compensation value of another block of the blocks BLK, which is adjacent to the one block, or the first compensation value.

The second compensation value may be generated by adding the representative compensation value of the second block BLK2 and a value obtained by interpolating representative compensation values of other blocks adjacent to the second block BLK2 among the blocks BLK or a value obtained by interpolating the representative compensation value of other blocks and the first compensation value. In an embodiment, when the block BLK at the second position is the second block BLK2, a value obtained by adding the representative compensation value of the block BLK at the second position and an average value of the representative compensation value of the block BLK at the first position and the first compensation value of the first block portion BLP1 may be generated as the second compensation value.

When the block BLK at the fourth position is the second block BLK2, a value obtained by adding the representative compensation value of the block BLK at the fourth position and an average value of the first compensation value of the second block portion BLP2 and the representative compensation value of the block BLK at the fifth position may be generated as the second compensation value.

When the block BLK at the fifth position is the second block BLK2, a value obtained by adding the representative compensation value of the block BLK at the fifth position and an average value of the representative compensation values of the blocks BLK at the fourth and sixth positions may be generated as the second compensation value.

The timing controller TCON may output the image data DS obtained by reflecting the first compensation value and the second compensation value in the input data RGB to the data driver DIC. The data driver DIC may output a voltage to the first block BLK1*a* based on the first compensation value and may output a voltage to the second block BLK2 based on the second compensation value. That is, the input data RGB may be compensated using the first compensation value in portions of the display area DA, which are adjacent to the boundary line BL-1, and the input data RGB may be compensated using the second compensation value in portions of the display area DA, which are spaced apart from the boundary line BL-1.

An after-compensation brightness value ACL-3 may be a brightness value of the image data DS in which the first compensation value and the second compensation value are reflected. The after-compensation brightness value ACL-3 may be uniform in the periods SS. That is, the first image IM1 and the second image IM2, which are displayed in the display panel DP, may have the uniform brightness.

According to the disclosure, the timing controller TCON may generate the first compensation value and the second compensation value with respect to the blocks BLK in the periods SS. The timing controller TCON may display the image through the display panel DP based on the image data DS in which the first compensation value and the second compensation value are reflected. The after-compensation brightness value ACL-3 of the image data DS output to the blocks BLK corresponding to the periods SS may be uniform. Accordingly, the image retention occurring in the display panel DP may be reduced or prevented. Thus, the display device DD with improved display quality may be provided.

Although the embodiments of the disclosure have been described, it is understood that the disclosure should not be limited to these embodiments but various changes and modifications may be made by one ordinary skilled in the art within the spirit and scope of the disclosure as hereinafter claimed. Therefore, the disclosed subject matter should not be limited to any single embodiment described herein, and the scope of the inventive concept shall be determined according to the attached claims.

What is claimed is:

1. A display device comprising:

a display panel in which a display area including a first area and a second area spaced apart from the first area in a predetermined direction is defined, the display panel comprising:

a plurality of blocks comprising a first block and a second block, the plurality of blocks each comprising a plurality of pixels; and a timing controller which generates a representative compensation value with respect to each of the plurality of blocks, wherein the first area displays a first image, the second area displays a second image different from the first image, a boundary line is defined between the first area and the second area, the first block is adjacent to the boundary line and the second block is spaced apart from the boundary line, the timing controller generates a flag signal with respect to the first block, the timing controller generates a first compensation value with respect to the first block based on the flag signal, and the timing controller generates a second compensation value different from the first compensation value using the representative compensation value of the second block and the representative compensation value of another block adjacent to the second block among the plurality of blocks.

2. The display device of claim 1, wherein the first block is provided in plural, and a plurality of first blocks comprises:

a first-first block; and a first-second block spaced apart from the first-first block with the boundary line interposed therebetween.

3. The display device of claim 2, wherein a plurality of first pixel units each comprising at least one pixel among the plurality of pixels is defined in the first-first block, a plurality of second pixel units each comprising at least one pixel among the plurality of pixels is defined in the first-second block, and the timing controller generates a plurality of first pixel compensation values with respect to the plurality of first pixel units, respectively, and generates a plurality of second pixel compensation values with respect to the plurality of second pixel units, respectively.

4. The display device of claim 3, wherein the first compensation value of the first-first block is a first average value of the plurality of first pixel compensation values, and the first compensation value of the first-second block is a second average value of the plurality of second pixel compensation values.

5. The display device of claim 4, wherein the first-first block is disposed in the first area, the first-second block is disposed in the second area, and the first average value is different from the second average value.

6. The display device of claim 1, wherein the second image is a black image.

7. The display device of claim 1, wherein the second block is provided in plural, and the first block is disposed between a plurality of second blocks.

8. The display device of claim 1, wherein the first block comprises a first block portion and a second block portion adjacent to the first block portion with the boundary line interposed therebetween.

9. The display device of claim 8, wherein a plurality of first pixel units each comprising at least one pixel among the plurality of pixels is defined in the first block portion, a plurality of second pixel units each comprising at least one pixel among the plurality of pixels is defined in the second block portion, and the timing controller generates a plurality of first pixel compensation values with respect to the plurality of first pixel units, respectively, and generates a plurality of second pixel compensation values with respect to the plurality of second pixel units, respectively.

10. The display device of claim 9, wherein the first compensation value of the first block portion is a first average value of the plurality of first pixel compensation values, and the first compensation value of the second block portion is a second average value of the plurality of second pixel compensation values.

11. The display device of claim 1, wherein the timing controller generates the first compensation value using only the representative compensation value of the first block.

12. The display device of claim 1, wherein the first block comprises a first block portion and a second block portion adjacent to the first block portion, and the timing controller generates a partial compensation value with respect to each of the first and second block portions.

13. The display device of claim 1, wherein the second compensation value is generated by adding the representative compensation value of the second block and a value obtained by interpolating the representative compensation value of another block adjacent to the second block among the plurality of blocks.

14. A display device comprising:

a display panel in which a display area including a first area and a second area spaced apart from the first area in a predetermined direction is defined, the display panel comprising:

a plurality of blocks comprising a first block and a second block, the plurality of blocks each comprising a plurality of pixels; and a timing controller which generates a representative compensation value with respect to each of the plurality of blocks, wherein the first area displays a first image, the second area displays a second image different from the first image, a boundary line is defined between the first area and the second area, the first block is adjacent to the boundary line and the second block is spaced apart from the boundary line, the timing controller generates a flag signal with respect to the first block and a first compensation value with respect to the first block in a first unit based on the flag signal, and the timing controller generates a second compensation value with respect to the second block in a second unit greater than the first unit.

15. The display device of claim 14, wherein the first block is provided in plural, and a plurality of first blocks comprises:

a first-first block; and a first-second block spaced apart from the first-first block with the boundary line interposed therebetween.

16. The display device of claim 15, wherein the first unit is defined as a pixel unit comprising at least one pixel among the plurality of pixels, the pixel unit comprises a plurality of first pixel units defined in the first-first block and a plurality of second pixel units defined in the first-second block, and the timing controller generates a plurality of first pixel compensation values with respect to the plurality of first pixel units, respectively, and generates a plurality of second pixel compensation values with respect to the plurality of second pixel units, respectively.

17. The display device of claim 16, wherein the first compensation value of the first-first block is a first average value of the plurality of first pixel compensation values, and the first compensation value of the first-second block is a second average value of the plurality of second pixel compensation values.

18. The display device of claim 17, wherein the first-first block is disposed in the first area, the first-second block is disposed in the second area, and the first average value is different from the second average value.

19. The display device of claim 14, wherein the second image is a black image.

20. The display device of claim 14, wherein the second compensation value is generated by adding the representative compensation value of the second block and a value obtained by interpolating the representative compensation value of another block adjacent to the second block among the plurality of blocks.

* * * * *